(12) United States Patent
Kunikata et al.

(10) Patent No.: US 7,497,287 B2
(45) Date of Patent: Mar. 3, 2009

(54) COOLING SYSTEM FOR VEHICLE

(75) Inventors: Yuhei Kunikata, Kariya (JP); Akihiro Maeda, Kariya (JP); Toshiki Sugiyama, Kariya (JP); Jun Hoshi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 10/898,730

(22) Filed: Jul. 23, 2004

(65) Prior Publication Data
US 2005/0029027 A1 Feb. 10, 2005

(30) Foreign Application Priority Data
Jul. 24, 2003 (JP) ............... 2003-279191

(51) Int. Cl.
*B60K 11/04* (2006.01)
(52) U.S. Cl. .................. 180/68.1; 180/68.4
(58) Field of Classification Search .......... 180/68.1, 180/68.2, 68.4, 68.6; 165/41
See application file for complete search history.

(56) References Cited
U.S. PATENT DOCUMENTS

| | | | | |
|---|---|---|---|---|
| 4,417,636 A | * | 11/1983 | Mazur | 180/68.4 |
| 4,534,506 A | * | 8/1985 | Ishida et al. | 236/35.3 |
| 5,526,872 A | * | 6/1996 | Gielda et al. | 165/41 |
| 5,901,786 A | * | 5/1999 | Patel et al. | 165/283 |
| 6,341,643 B1 | * | 1/2002 | Osakabe | 165/41 |
| 6,543,525 B2 | * | 4/2003 | Kalbacher | 165/140 |

FOREIGN PATENT DOCUMENTS

| | | | |
|---|---|---|---|
| JP | 2000-211377 | | 8/2000 |
| JP | 2003-72394 | * | 3/2003 |

* cited by examiner

*Primary Examiner*—Frank B Vanaman
(74) *Attorney, Agent, or Firm*—Harness, Dickey & Pierce, PLC

(57) ABSTRACT

In a ventilation duct of a cooling system, a level difference is formed between a wall located on a vehicle front side and a wall located on a vehicle rear side because a bottom end of the wall located on the vehicle front side is lower than a bottom end of the wall located on the vehicle rear side. The level difference makes a speed of a traveling wind flowing near an outlet faster than that flowing away from the outlet. Therefore, a pressure of the traveling wind flowing near the outlet decreases. As a result, air flows in the ventilation duct to be drawn to the neighborhood of the low-pressure outlet, and discharged out. Because cooling air including the traveling wind can be increased, heat radiation capacity of a radiator disposed in the ventilation duct is improved, and the cooling capacity of the cooling system can also be improved.

13 Claims, 3 Drawing Sheets

COOLING SYSTEM FOR VEHICLE

CROSS REFERENCE TO RELATED APPLICATION

This application is based on Japanese Patent Application No. 2003-279191 filed on Jul. 24, 2003, the disclosure of which are incorporated herein by reference.

FIELD OF THE INVENTION

The present invention relates to a cooling system for a vehicle. The cooling system is suitably used for a vehicle driving source for traveling, such as an internal combustion engine (engine) and an electric motor including a motor driving circuit.

BACKGROUND OF THE INVENTION

A cooling system for a vehicle supplies a traveling wind or a cooling air blown by a blower to a radiator. However, it is difficult to improve a heat radiation capacity of the radiator, that is, a cooling capacity of the cooling system by using a simple structure.

SUMMARY OF THE INVENTION

In view of the above-described problem, it is an object of the present invention to improve the cooling capacity of a cooling system by using a simple structure.

According to an aspect of the present invention, a cooling system for a vehicle includes a heat exchanger for radiating heat, and a ventilation duct extending from a rear surface of the heat exchanger to a vehicle rear side. The ventilation duct has an outlet for discharging air after passing through the heat exchanger to an exterior, and a wall connected to an edge portion defining the outlet. The wall is disposed to intersect with a vehicle front-rear direction, and the edge portion has a front end and a rear end in the vehicle front-rear direction, which are offset from each other in a vertical direction such that an opening direction of the outlet leans to a vehicle rear side from the vertical direction.

Accordingly, a speed of air flowing near the outlet can be made faster than that flowing away from the outlet, and a pressure of air flowing near the outlet decreases. Therefore, air in the ventilation duct is drawn to a neighborhood of the low-pressure outlet and discharged to an exterior of the ventilation duct. In this case, because cooling air including the traveling wind supplied to the heat exchanger can be effectively increased, heat radiation capacity of the heat exchanger, that is, cooling capacity of the cooling system can also be improved.

According to another aspect of the present invention, the edge portion defining the outlet is provided at a bottom side of the wall, and a bottom end of the wall on a vehicle front side is positioned lower than a bottom end of the wall on a vehicle rear side. In this case, the opening direction of the outlet can be readily set to lean to the vehicle rear side from the vertical direction.

For example, the wall is arranged to increase a flow speed of air around the outlet. That is, a speed increasing portion can be provided in the ventilation duct. Alternatively, the wall is arranged to reduce a pressure of air flowing around the outlet. That is, a pressure reducing portion can be provided in the ventilation duct. In this case, the air amount passing through the heat exchanger can be effectively increased.

Generally, a blower is disposed downstream of the heat exchanger in an air flow for blowing air to the heat exchanger. As the blower, a cross-flow fan or an axial fan can be used.

Further, the ventilation duct has a communication hole at a position upstream from the blower in the air flow, and an interior of the ventilation duct communicates with an exterior of the ventilation duct through the communication hole. In this case, even when a large amount of air flows into the ventilation duct in a high-speed vehicle traveling, air can be readily discharged also through the communication hole, and air pressure in the ventilation duct can be reduced. The communication hole can be closed when the blower is operated.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

The first embodiment of the present invention will be now described with reference to FIGS. 1-3.

Figure 1:
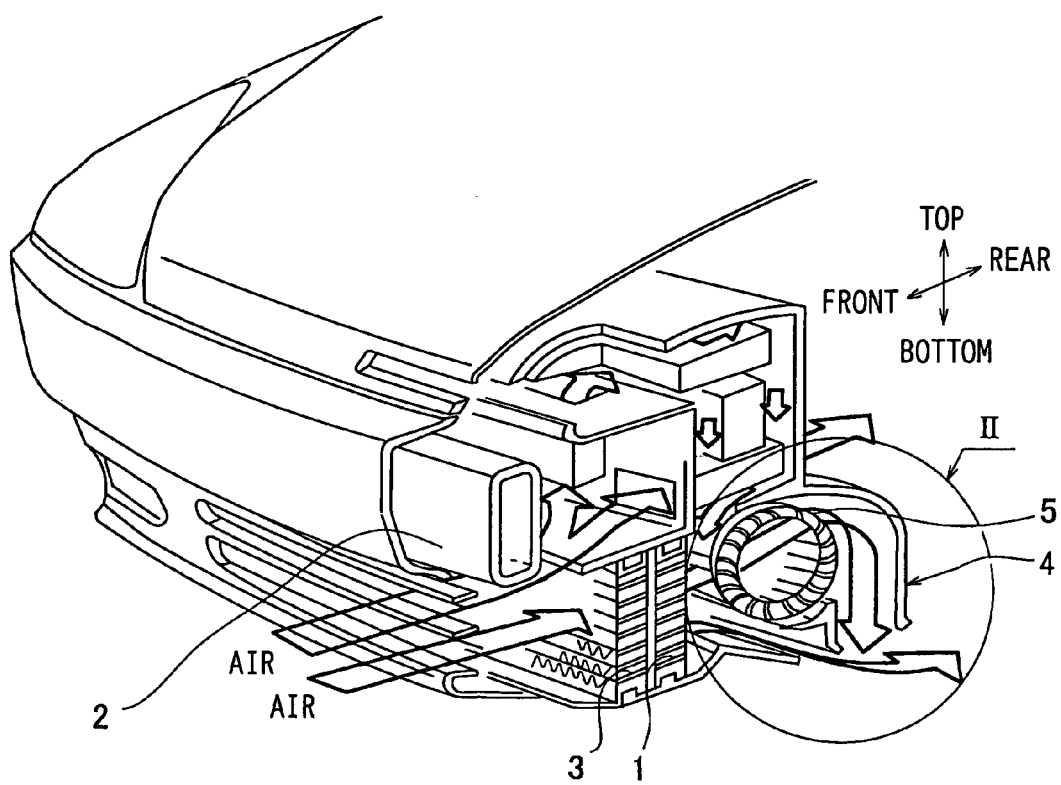
FIG. 1 is a schematic diagram showing a vehicle front end structure with a cooling system according to a first embodiment of the present invention.

In FIG. 1, a radiator 1 is a heat exchanger for radiating heat, which cools engine-cooling water by exchanging heat between the outside air and the engine-cooling water which has cooled an engine (an internal-combustion engine). The engine is used in a vehicle as a driving source for traveling.

In this embodiment, among the external size of the radiator 1, a dimension parallel to a vehicle width is made larger than a dimension parallel to a vehicle height direction. Therefore, the height dimension of the radiator 1 is shortened to make the radiator 1 flat while a sufficient heat radiation capacity of the radiator 1 is maintained. Then, the radiator 1 is disposed in the vehicle, such that the whole radiator 1 is positioned lower than a bumper reinforcement member 2 when viewed from a vehicle front.

The bumper reinforcement member 2 lies in a vehicle front end portion to extend in a vehicle width direction. The bumper reinforcement member 2 is formed into a beam like member and is generally made of metal for absorbing an impact force from the vehicle front.

A condenser 3 is a radiator of a vapor compression refrigerator for a vehicle air-conditioning device. In the vapor compression refrigerator, heat is absorbed from air blown into a compartment, and is radiated by the condenser 3 to an exterior of the compartment.

Figure 2:
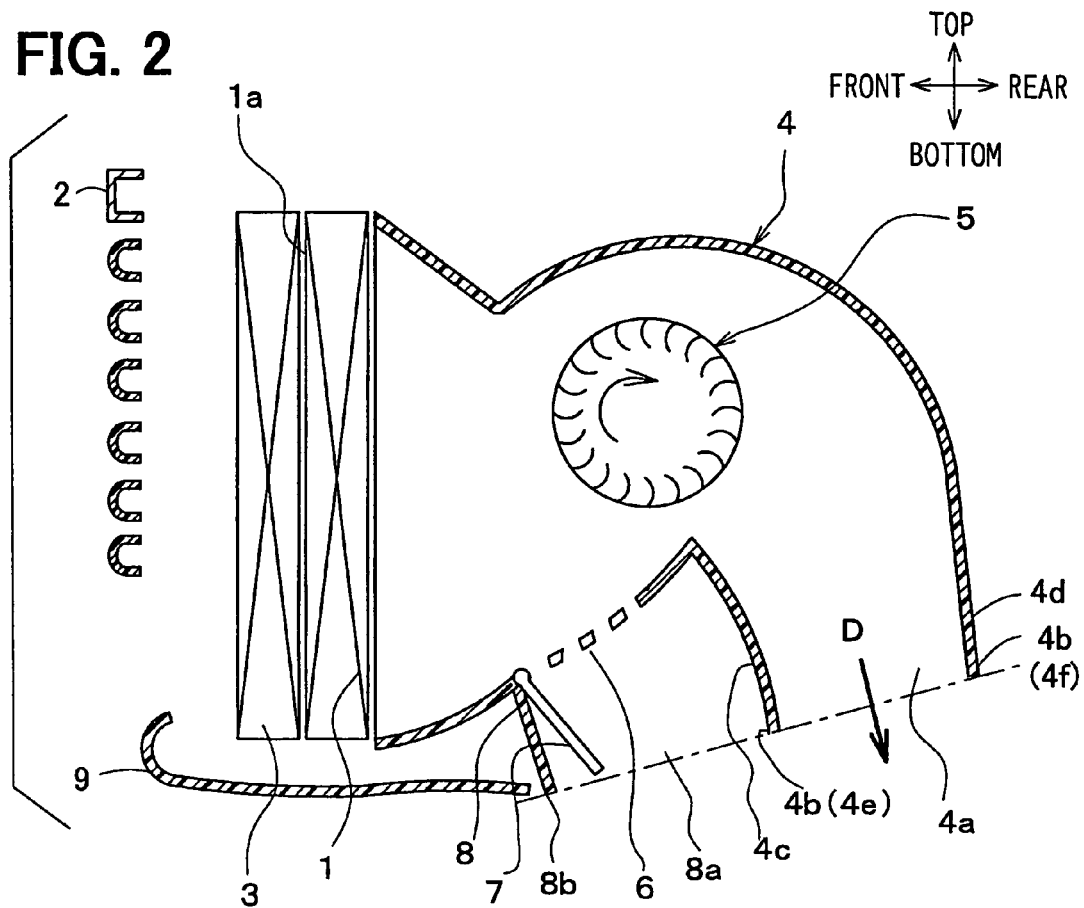
FIG. 2 is an enlarged schematic sectional view of the part II in FIG. 1.

As shown in FIG. 2, a ventilation duct 4 made of resin (e.g., polypropylene in embodiment) is disposed at a vehicle rear side of the radiator 1 to extend to the vehicle rear side from a rear surface of the radiator 1. In the ventilation duct 4, an outlet 4a is provided for discharging the air having passed through the radiator 1.

In the ventilation duct 4, a wall 4c and a wall 4d connect to an edge 4b for defining the outlet 4a to intersect with a front-rear direction of the vehicle. Further, a vehicle front portion and a vehicle rear portion of the edge 4b are offset from each other in the vertical direction, so that the opening direction of the outlet 4a leans to the vehicle rear side relative to the vertical direction.

In a direction parallel to the normal line of the curved surface or plane of the walls 4c, 4d including the edge 4b of the outlet 4a, an opening direction of the outlet 4a is same as a direction of the air discharged from the outlet 4a (i.e., direction D in FIG. 2). That is, in FIG. 2, the direction D indicates the opening direction of the outlet 4a.

In this embodiment, a difference in level is formed between the wall 4c positioned on the vehicle front side and the wall 4d positioned on the vehicle rear side, because a bottom end 4e of the wall 4c is located lower than a bottom end 4f of the wall 4d.

The outlet 4a of this embodiment has an opening like an approximate rectangle shape, to extend almost to the whole area in the vehicle width direction at a lower side within an engine compartment.

A blower 5 for blowing the cooling air to the radiator 0.1 is disposed in the ventilation duct 4 at a downstream air side of the radiator 1. In this embodiment, a cross-flow fan (referring to JIS B 0132 No.1017) is used as the blower, where air passes through a multibladed fan in a section perpendicular to an axis direction of the fan. Further, the blower 5 is mounted in the vehicle such that the axis direction of the blower 5 is coincident with the vehicle width direction.

On an upstream air side of the blower 5 in the ventilation duct 4, a communication hole 6 is provided to communicate the inside and outside of the ventilation duct 4 with each other. A switch valve 7 is provided in the communication hole 6. The switch valve 7 opens the communication hole 6 when the traveling wind pressure applied to the ventilation duct 4 is larger than a predetermined pressure, that is, when the vehicle speed is faster than a predetermined speed. The switch valve 7 closes the communication hole 6 when the blower 5 is operating.

The switch valve 7 of this embodiment is constructed with a lead valve, and is disposed in the communication hole 6 on an outside of the ventilation duct 4. Because the switch valve 7 is made of rubber or resin that is elastic and flexible, the communication hole 6 is closed by a negative pressure at the upstream air side of the blower 5 and opened by the traveling-wind pressure.

Among a wall 8 and the wall 4c connecting to the communication hole 6, the bottom position of the wall 8 on the vehicle front side is made lower than the bottom position of the wall 4c on the vehicle rear side, similarly to the wall 4c and the wall 4d connecting to the outlet 4a. As a result, the opening direction of an outlet 8a that is formed by the wall 8 and the wall 4c leans to the vehicle rear side relative to the vertical direction.

Therefore, a difference in level is formed between the wall 8 and the wall 4c because a bottom end 8b of the wall 8 is lower than the bottom end 4e of the wall 4c.

In this embodiment, an undercover 9 extends from the front end of the vehicle to the bottom end 8b of the wall 8 to smoothly flow the traveling wind introduced to a vehicle front lower portion to the vehicle rear side.

Advantages of this embodiment will be described as following.

In this embodiment, the bottom end 4e of the wall 4c is lower than the bottom end 4f of the wall 4d, to have the level difference between the wall 4c and the wall 4d. As shown in FIG. 3, the level difference makes the speed of the traveling wind flowing near the outlet 4a faster than that flowing away from the outlet 4a. Therefore, the pressure of the traveling wind flowing near the outlet 4a decreases. As a result, the air in the ventilation duct 4 flows to be drawn to the neighborhood of the low-pressure outlet 4a and is discharged to the outside.

Figure 3:
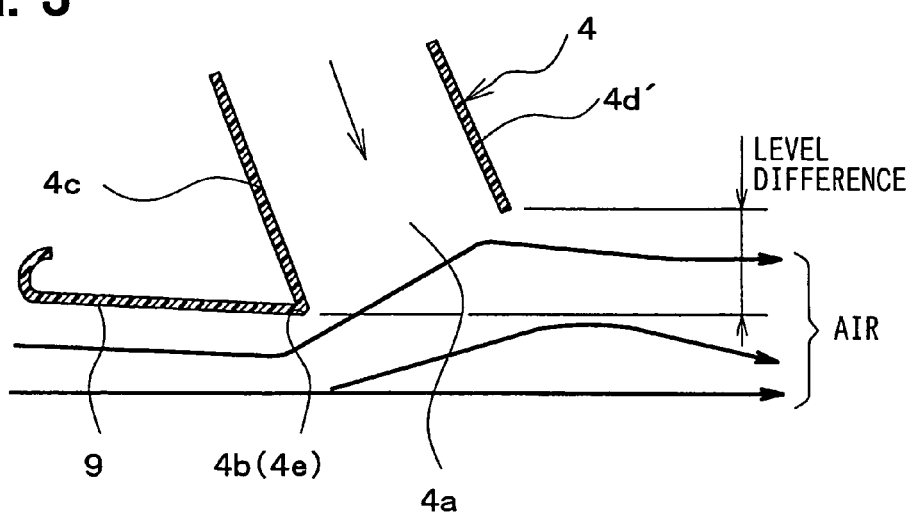
FIG. 3 is a schematic sectional view for explaining an effect of the first embodiment.
Figure 4:
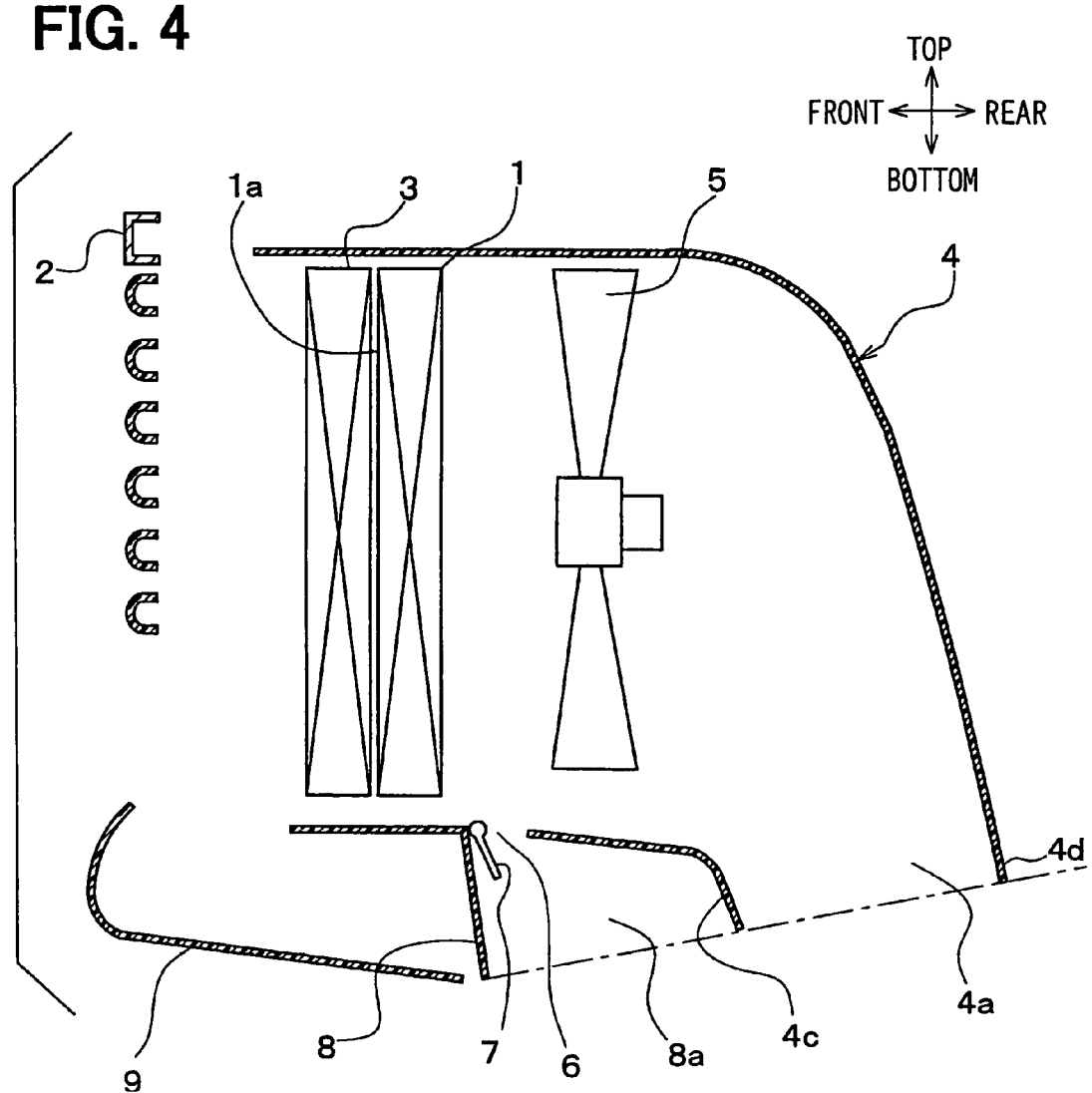
FIG. 4 is a schematic sectional view showing a vehicle front end structure using a cooling system according to a second embodiment of the present invention.

In FIG. 3, a long arrow line shows a fast flow speed of the traveling wind introduced under the under cover 9. It can be found that the speed of the traveling wind increases near the outlet 4a. Thus, the cooling air (including the traveling wind) to be supplied to the radiator 1 or the condenser 3 can be increased, and the heat radiation capacity of the radiator 1, that is, the cooling capacity of the cooling system can also be improved.

Generally, the passage section area of the ventilation duct 4 is selected according to the maximum blowing capacity of the blower 5. Considering a mounting space of the ventilation duct 4, it is difficult to ensure a large passage section area in the ventilation duct 4.

If an air amount flowing into the ventilation duct 4 increases when the vehicle speed increases, a pressure loss also increases in the ventilation duct 4. As a result, it is difficult to ensure an enough air amount in a high-speed vehicle traveling that needs large heat radiation capacity.

Generally, when the section area of the air passage (fluid passage) is certain, the pressure loss in the air passage becomes larger approximately in proportion to a square of the air flow speed.

Accordingly, in this embodiment, the communication hole 6 is provided in the ventilation duct 4. Therefore, it is possible to discharge quickly a large amount of cooling air flowing into the ventilation duct 4. Therefore, an increase of the pressure loss in the ventilation duct 4 can be restricted to ensure an enough air amount in a high-speed vehicle traveling that needs a large heat radiation capacity.

When the traveling wind disappears because of the traffic congestion, it is necessary to blow the cooling air to the radiator 1 by the blower 5. At this time, if the communication hole 6 is in an open state, the cooling air due to the blower 5 bypasses the radiator 1.

In this embodiment, because the communication hole 6 is closed when the blower 5 is operating, the cooling air can be effectively supplied to the radiator 1 by the blower 5.

With respect to the rotating axis of the fan, blades moves reversely in the cross-flow fan. The blades on one side (a lower side in this embodiment) are readily applied by a reverse force due to the traveling wind pressure. As a result, the power consumed by the blower 5 may be increased.

In this embodiment, that reverse force is decreased because the communication hole 6 is provided in the ventilation duct 4 at the side where the reverse force applies to the blades. Therefore, it is possible to restrict an increase of the power consumed by the blower 5.

In this embodiment, the outlet 8a connecting to the communication hole 6 has a same structure as the outlet 4a. Therefore, the speed of the traveling wind flowing near the outlet 8a increases and the pressure thereof decreases. As a result, the traveling wind flows through the ventilation duct 4 to be drawn to the neighborhood of the low-pressure outlet 8a, and discharged out of the ventilation duct 4.

Because the traveling wind flowing into the ventilation duct 4 through the radiator 1 can be discharged effectively, the heat radiation capacity of the radiator 1 can be improved by increasing the air amount passing through the radiator 1.

Second Embodiment

In this embodiment, an axis-flow fan (referring to JIS B 0132 No.1012) is used as the blower 5, where air passes through the fan in its axis direction. In the second embodiment, the other parts are similar to those of the above-described first embodiment.

Other Embodiments

Although the present invention has been fully described in connection with the preferred embodiments thereof with reference to the accompanying drawings, it is to be noted that various changes and modifications will become apparent to those skilled in the art.

For example, each of the outlet 4a and the outlet 8a can also be constructed with an upward or sideward opening, without being limited to the above-described embodiments where each of the outlet 4a and the outlet 8 is constructed with a downward opening.

In the above-described embodiments, a heat-exchange core surface 1a of the radiator 1 is arranged in the vehicle nearly parallel to the vertical direction. However, the present invention is not limited to this.

In the above-described embodiments, the communication hole 6 is closed by the negative pressure at the upstream side of the blower 5 and opened by the traveling-wind pressure larger than a predetermined pressure. However, the valve 7 can be also operated forcibly by an actuator.

In the above-described embodiments, among walls connecting to the communication hole 6, the wall on the vehicle rear side is also used as the wall 4c defining an outlet 4a; however, the present invention is not limited to this.

In the above-described embodiments, the undercover 9 extends to the bottom end 8b of the wall 8; however, the undercover 9 can also be disused.

Such changes and modifications are to be understood as being within the scope of the present invention as defined by the appended claims.

What is claimed is:

1. A cooling system for a vehicle, comprising:
    a radiator for radiating heat;
    a ventilation duct extending from a rear surface of the radiator to a vehicle rear side, the ventilation duct having an outlet for discharging air having passed through the radiator to an exterior;
    a blower disposed downstream of the radiator in an airflow direction; wherein
    the ventilation duct has a wall connected to an edge portion defining the outlet;
    the wall is disposed to intersect with a vehicle front-rear direction;
    the edge portion has a front end and a rear end in the vehicle front-rear direction, which are offset from each other in a vertical direction such that an opening direction of the outlet leans to a vehicle rear side from the vertical direction;
    the ventilation duct has a communication hole at a position upstream from the blower in the air flow direction and downstream from the radiator in the air flow direction; and
    an interior of the ventilation duct communicates with an exterior of the ventilation duct through the communication hole, the communication hole being provided to directly discharge air flow from the ventilation duct after the air flow passes through the radiator and before the air flow reaches the blower independently from the outlet of the ventilation duct; the cooling system further comprising;
    an air pressure responsive valve disposed within the ventilation duct to open and close the communication hole.

2. The cooling system according to claim 1, wherein:
    the edge portion defining the outlet is provided at a bottom side of the wall; and
    a bottom end of the wall on a vehicle front side is positioned lower than a bottom end of the wall on a vehicle rear side.

3. The cooling system according to claim 1, wherein the wall is arranged to increase a flow speed of air around the outlet.

4. The cooling system according to claim 1, wherein the wall is arranged to reduce a pressure of air flowing around the outlet.

5. The cooling system according to claim 1, wherein the blower is a cross-flow fan.

6. The cooling system according to claim 1, wherein:
    the wall is arranged downstream from the blower in the air flow.

7. The cooling system for a vehicle according to claim 1, further comprising a condenser disposed at a position upstream from the radiator.

8. A cooling system for a vehicle, comprising:
    a heat exchanger for radiating heat, the heat exchanger being mounted on a front end portion of the vehicle;
    a ventilation duct extending from a rear surface of the heat exchanger to a vehicle rear side, the ventilation duct having an outlet for discharging air having passed through the heat exchanger to an exterior of the ventilation duct;
    a blower disposed within the ventilation duct downstream of the heat exchanger in an air flow direction for drawing air through the heat exchanger, the ventilation duct having a communication hole through which an upstream air side of the blower communicates with the exterior of the ventilation duct and a communication outlet portion in communication with the communication hole, the communication outlet portion being defined by a wall portion and a wall of the ventilation duct and the wall portion being positioned on a front side of the communication outlet portion; and
    a valve disposed within the ventilation duct, the valve being movable between a first position closing the communication hole when air pressure at the exterior of the ventilation duct exceeds air pressure within the ventilation duct and a second position opening the communication hole when the air pressure in the ventilation duct exceed the air pressure at the exterior of the ventilation duct; wherein
    the wall of the ventilation duct is connected to an edge portion defining the outlet at a bottom side of the wall of the ventilation duct;
    the wall is disposed to intersect with a vehicle front-rear direction; and
    a bottom end of the wall on a vehicle front side is positioned lower than a bottom end of the wall on a vehicle rear side.

9. The cooling system according to claim 8, wherein the blower is a cross-flow fan.

10. A cooling system for a vehicle, comprising:
    a radiator for radiating heat;
    a ventilation duct extending from a rear surface of the radiator to a vehicle rear side, the ventilation duct having an outlet for discharging air having passed through the radiator to an exterior;

a blower disposed downstream of the radiator in an airflow direction; wherein the ventilation duct has a wall connected to an edge portion defining the outlet;

the wall is disposed to intersect with a vehicle front-rear direction;

the edge portion has a front end and a rear end in the vehicle front-rear direction, which are offset from each other in a vertical direction such that an opening direction of the outlet leans to a vehicle rear side from the vertical direction;

the ventilation duct has a communication hole at a position upstream from the blower in the air flow direction and downstream from the radiator in the air flow direction;

an interior of the ventilation duct communicates with an exterior of the ventilation duct through the communication hole; and the ventilation duct defines a communication hole wall extending downward from the communication hole at a vehicle front side of the outlet, a bottom end of the communication hole wall is positioned lower than a bottom end of the wall on the vehicle front side.

11. The cooling system for a vehicle according to claim 10, further comprising an air pressure responsive valve disposed within the ventilation duct to open and close the communication hole.

12. A cooling system for a vehicle, comprising:

a radiator for radiating heat;

a ventilation duct extending from a rear surface of the radiator to a vehicle rear side, the ventilation duct having an outlet for discharging air having passed through the radiator to an exterior;

a blower disposed downstream of the radiator in an airflow direction; and a valve disposed within the ventilation duct, the valve being movable between a first position closing a communication hole when air pressure at the exterior of the ventilation duct exceeds air pressure within the ventilation duct and a second position opening the communication hole when the air pressure in the ventilation duct exceed the air pressure at the exterior of the ventilation duct; wherein the ventilation duct has a wall connected to an edge portion defining the outlet;

the wall is disposed to intersect with a vehicle front-rear direction;

the edge portion has a front end and a rear end in the vehicle front-rear direction, which are offset from each other in a vertical direction such that an opening direction of the outlet leans to a vehicle rear side from the vertical direction;

the ventilation duct communication hole being located at a position upstream from the blower in the air flow direction and downstream from the radiator in the air flow direction; and an interior of the ventilation duct communicates with an exterior of the ventilation duct through the communication hole.

13. A cooling system for a vehicle, comprising:

a radiator for radiating heat;

a ventilation duct extending from a rear surface of the radiator to a vehicle rear side, the ventilation duct having an outlet for discharging air having passed through the radiator to an exterior;

a blower disposed downstream of the radiator in an airflow direction; wherein the ventilation duct has a wall connected to an edge portion defining the outlet;

the wall is disposed to intersect with a vehicle front-rear direction;

the edge portion has a front end and a rear end in the vehicle front-rear direction, which are offset from each other in a vertical direction such that an opening direction of the outlet leans to a vehicle rear side from the vertical direction;

the ventilation duct has a communication hole at a position upstream from the blower in the air flow direction and downstream from the radiator in the air flow direction; and an interior of the ventilation duct communicates with an exterior of the ventilation duct through the communication hole, the communication hole being provided to directly discharge air flow from the ventilation duct after the air flow passes through the radiator and before the air flow reaches the blower independently from the outlet of the ventilation duct; and a bottom of the wall portion is positioned lower than a bottom end of the wall on a vehicle front side.

* * * * *